Patented Sept. 19, 1950

2,522,707

UNITED STATES PATENT OFFICE 2,522,707

COMPOSITION FOR AND METHOD OF COATING CONCRETE STRUCTURES

Knud Aage Faber and Jens Laurits Jensen, Aarhus, Denmark

No Drawing. Application January 27, 1948, Serial No. 4,714. In Denmark August 17, 1946

Section 1, Public Law 690, August 8, 1946
Patent expires August 17, 1966

6 Claims. (Cl. 117—169)

This invention relates to impregnating or coating walls and floors or the like of material such as masonry or concrete to render them more resistant to penetration by moisture.

Walls and floors of masonry or the like are sometimes protected against the penetration of moisture by coating them with asphalt or tar or similar compositions, but such measures have disadvantages in that they may give rise to an undesirable odour when used within-doors, or the compositions may flake off or crack so that the moisture may penetrate the protecting coating.

One object of the invention is to provide an improved composition for impregnating or coating walls and floors or the like of masonry or similar material to render them more resistant to penetration by moisture. The composition consists of materials which are readily and cheaply available, and it may be easily applied by means of a brush or the like, it has little or no odour, and it also has the same expansion coefficient as the surfaces to which it is applied so that the resistance to moisture of such surfaces persists over long periods.

According to the invention a composition for the purpose described comprises or consists of 35 to 75% by weight of cement, 25 to 35% of sodium carbonate, and 3 to 15% of tartaric acid. The ingredients are mixed together in powder form, and when required for use are mixed with water to form a soft paste which is applied by means of a brush or in any other suitable manner to the surfaces to be impregnated or coated. The proportions of the ingredients are varied according to the degree of moisture of the surface to be treated.

A composition preferred for treating surfaces subject to a comparatively small degree of moisture is as follows:

*Example 1.*—The composition consists of 500 parts by weight of cement, 200 parts of sodium carbonate and 35 parts of tartaric acid; these ingredients are mixed together in powder form, and water is added to form a soft paste for application to the surfaces.

For surfaces subject to a high degree of moisture the composition preferred is as follows:

*Example 2.*—The composition consists of 400 parts by weight of cement, 300 parts of sodium carbonate, 100 parts of pulverised waterglass, 100 parts of magnesium silico-fluoride, and 100 parts of tartaric acid. The composition is prepared and applied as described above.

In all cases the composition is transformed into a paste by adding water just before it is required, and it then immediately applied to the surfaces to be treated.

Having now particularly described and ascertained the nature of our said invention, and in what manner the same is to be performed, we declare that what we claim is:

1. In a composition for impregnating or coating walls and floors or the like of material such as masonry or concrete to render them more resistant to penetration by moisture, comprising or consisting of 35 to 75% by weight of cement, 25 to 35% of sodium carbonate and 3 to 15% of tartaric acid.

2. A composition according to claim 1, comprising or consisting of approximately 500 parts by weight of cement, 200 parts of sodium carbonate and 35 parts of tartaric acid.

3. A composition according to claim 1, comprising or consisting of approximately 400 parts by weight of cement, 200 parts of sodium carbonate, 100 parts of pulverised waterglass, 100 parts of magnesium silico-fluoride, and 100 parts of tartaric acid.

4. A method of impregnating surfaces of buildings made of masonry comprising the steps of mixing 35 to 75% by weight of powdered cement, 25 to 35% of powdered sodium carbonate and 3 to 15% of powdered tartaric acid; adding water to the mixture to form a soft paste; and applying the paste immediately after making it to the surface to be impregnated.

5. A method of impregnating surfaces of buildings made of masonry comprising the steps of mixing approximately 500 parts by weight of powdered cement, approximately 200 parts of powdered sodium carbonate and approximately 35 parts of powdered tartaric acid; adding water to the mixture to form a soft paste; and applying the paste immediately after making it to the surface to be impregnated.

6. A method of impregnating surfaces of buildings made of masonry comprising the steps of mixing approximately 400 parts by weight of powdered cement, approximately 300 parts of powdered sodium carbonate, approximately 100 parts of pulverized waterglass, approximately 100 parts of powdered magnesium silicofluoride and approximately 100 parts of powdered tartaric acid; adding water to the mixture to form a soft paste; and applying the paste immediately after making it to the surface to be impregnated.

KNUD AAGE FABER.
JENS LAURITS JENSEN.

REFERENCES CITED

The following references are of record in the file of this patent:

UNITED STATES PATENTS

| Number | Name | Date |
|---|---|---|
| 2,174,051 | Winkler | Sept. 26, 1939 |

FOREIGN PATENTS

| Number | Country | Date |
|---|---|---|
| 123,698 | Switzerland | 1927 |
| 719,830 | France | 1931 |